(12) United States Patent
Bourdeau et al.

(10) Patent No.: US 8,736,445 B2
(45) Date of Patent: May 27, 2014

(54) OBJECT LOCATING SYSTEM

(75) Inventors: Cynthia Bourdeau, Blainville (CA); Line Quintal, Blainville (CA)

(73) Assignee: Excellence Chrysler, St.-Eustache, Quebec (CA)

( * ) Notice: Subject to any disclaimer, the term of this patent is extended or adjusted under 35 U.S.C. 154(b) by 306 days.

(21) Appl. No.: 13/319,606

(22) PCT Filed: Mar. 9, 2010

(86) PCT No.: PCT/CA2010/000338
§ 371 (c)(1),
(2), (4) Date: Jan. 6, 2012

(87) PCT Pub. No.: WO2010/132978
PCT Pub. Date: Nov. 25, 2010

(65) Prior Publication Data
US 2012/0105226 A1    May 3, 2012

(30) Foreign Application Priority Data
May 16, 2009  (GB) .................................. 0908444.3

(51) Int. Cl.
*G08B 1/08*  (2006.01)

(52) U.S. Cl.
USPC .................... 340/539.32; 340/8.1; 340/573.1

(58) Field of Classification Search
USPC ...................... 340/539.32, 539.13, 8.1, 573.1
See application file for complete search history.

(56) References Cited

U.S. PATENT DOCUMENTS

| | | |
|---|---|---|
| D349,662 S | 8/1994 | Butcher et al. |
| D367,017 S | 2/1996 | Dempsey |
| 5,677,673 A | 10/1997 | Kipnis |
| 5,680,105 A | 10/1997 | Hedrick |
| D424,464 S | 5/2000 | Stephens |
| 6,133,832 A | 10/2000 | Winder et al. |
| 6,236,319 B1 * | 5/2001 | Pitzer et al. ................. 340/573.4 |
| 6,297,737 B1 | 10/2001 | Irvin |
| 6,366,202 B1 | 4/2002 | Rosenthal |
| 6,462,658 B1 | 10/2002 | Bender |
| 6,535,125 B2 | 3/2003 | Trivett |
| 6,573,832 B1 | 6/2003 | Fugere-Ramirez |
| 6,624,754 B1 * | 9/2003 | Hoffman et al. ............ 340/573.1 |
| 6,674,364 B1 | 1/2004 | Holbrook et al. |
| 6,774,787 B1 * | 8/2004 | Melbourne ................. 340/539.1 |

(Continued)

FOREIGN PATENT DOCUMENTS

GB    2384897    8/2003

*Primary Examiner* — Toan N Pham
(74) *Attorney, Agent, or Firm* — Norton Rose Fulbright Canada LLP

(57) ABSTRACT

An object locating system comprising a first transmitter-receiver unit including a first transmitter for selectively transmitting a first and/or a second search signal, a first receiver for receiving a third search signal and a first signaling element coupled to the first receiver for issuing a first alarm when the third search signal is received by the first receiver; a second transmitter-receiver unit including a second transmitter for selectively transmitting the first and/or the third search signal, a second receiver for receiving the second search signal and a second signaling element coupled to the second receiver for issuing a second alarm when the second search signal is received by the second receiver; a receiver unit including a third receiver for receiving the first search signal and a third signaling element coupled to the third receiver for issuing a third alarm when the first search signal is received by the third receiver.

18 Claims, 3 Drawing Sheets

(56) References Cited

U.S. PATENT DOCUMENTS

| | | |
|---|---|---|
| 6,956,475 B1 | 10/2005 | Hill |
| 7,064,662 B2 | 6/2006 | Goggin |
| D526,586 S | 8/2006 | McCaghren et al. |
| 7,301,453 B2 * | 11/2007 | Fry .......................... 340/539.13 |
| 7,362,222 B1 | 4/2008 | Holz |
| D573,498 S | 7/2008 | Sherwood |
| 7,453,357 B2 * | 11/2008 | Bernal-Silva et al. ... 340/539.32 |
| 2002/0126010 A1 | 9/2002 | Trimble et al. |
| 2003/0058107 A1 | 3/2003 | Ferrier et al. |
| 2005/0168338 A1 | 8/2005 | Parker et al. |
| 2007/0090947 A1 | 4/2007 | Adrian et al. |
| 2007/0247309 A1 | 10/2007 | Olson |
| 2008/0062120 A1 * | 3/2008 | Wheeler et al. ................ 345/156 |

* cited by examiner

OBJECT LOCATING SYSTEM

This application claims priority from GB Patent Application No. 0908444.3 on May 16, 2009.

FIELD OF THE INVENTION

The present invention relates generally to systems for locating objects.

BACKGROUND

Lost object locating systems are known in the art and are useful for helping a user to locate the position of lost objects such as a TV remote, a set of car keys, a piece of jewelry, or the likes. Typical object locating systems of the prior art generally include a hand-held transmitter unit, and a receiver unit. The hand-held transmitter unit is generally represented by a device that includes a housing, a battery operated radio-frequency (RF) transmitter circuit and an activation push-button. The receiver unit usually takes the form of a tag attachable to an object whose position may need to be located by the user, and generally consists of a housing, a battery-operated RF receiver circuit and a sound emitting means.

In use, when it is required to locate the position of a lost object equipped with a receiver unit, the user presses on the push-button of the transmitter unit which, in turn, generates an RF search signal. When the RF search signal is detected by the receiver unit attached to the object, the receiver unit generates an audible sound, which helps the user to locate the position of the object.

More complex object locating systems may include an elaborate base transmitter device that interacts, on an individual basis, with a plurality of receiver units attached to a corresponding number of objects that often need to be located. Some of these complex systems may also provide the user with additional information such as the direction and distance separating the transmitter and the receiver attached to a lost object. These additional information typically take the form of modulated audible sound signals emitted by, and/or written information displayed on, the base transmitter.

These object locating systems are typically used in and around the vicinity of conventional residential houses or apartments, which generally corresponds to a range of a few tens of meters between a transmitter and a receiver, and which may encompass two or three wall divisions.

While many prior art devices generally offer an object locating system for helping a user locate a lost or misplaced object, they also entail one or more of the following disadvantages: they generally include only one transmitter, which is itself a relatively small object that is itself subject to being lost or misplaced by the user; the versions of object locating systems that include mutually locatable pairs of transmitter-receiver units, generally equipped with activation push-buttons, are relatively larger than the smaller tag equipped with only an RF receiver, and are generally too large to be attached to a relatively small valuable object such as, for example, a piece of jewelry; and the more complex object locating systems, which can address and locate multiple receiver units, have a base transmitter that is generally too large and cumbersome to carry along on a daily basis.

Against this background, there exists a need for a new and improved object locating system. It is a general object of the present invention to provide a new and improved object locating system.

SUMMARY OF THE INVENTION

In a broad aspect, the invention provides an object locating system usable by an intended user for locating an object, the object locating system comprising: a first transmitter-receiver unit including a first unit transmitter for selectively transmitting at least one of a first search signal and a second search signal, a first unit receiver for receiving a third search signal and a first unit signaling element operatively coupled to the first unit receiver for issuing a first alarm perceptible by the intended user when the third search signal is received by the first unit receiver; a second transmitter-receiver unit including a second unit transmitter for selectively transmitting at least one of the first search signal and the third search signal, a second unit receiver for receiving the second search signal and a second unit signaling element operatively coupled to the second unit receiver for issuing a second alarm perceptible by the intended user when the second search signal is received by the second unit receiver; a receiver unit including a third unit receiver for receiving the first search signal and a third unit signaling element operatively coupled to the third unit receiver for issuing a third alarm perceptible by the intended user when the first search signal is received by the third unit receiver. The first transmitter-receiver unit is configured and sized to be wearable by the intended user and the receiver unit is securable to the object. The first and second transmitter-receiver units are usable by the intended user to locate each other and are each usable by the intended user to locate the receiver unit.

For example, the first, second and third search signals are radio frequency electromagnetic signals, ultrasound signals, or any other type of signals.

In some embodiments of the invention, the second and third search signals are substantially similar to each other. In these embodiments, the first and second unit transmitters may be operatively coupled respectively to the first and second unit signaling elements for suppressing respectively the first and second alarms when the first and second unit transmitters emit respectively the second and third search signals.

In some embodiments of the invention, the first, second and third alarms are visual alarms and the first, second and third unit signaling elements each include a respective light emitting source for emitting the first, second and third alarms. In other embodiments of the invention, the first, second and third alarms are audible alarms and the first, second and third unit signaling elements each include a respective sound emitting element for emitting the first, second and third alarms. The first and second alarms are substantially identical to each other and typically differ from the third alarm.

In some embodiments of the invention, the first transmitter-receiver unit includes a substantially 8-shaped casing defining two substantially adjacent substantially circular regions, the casing containing the first unit receiver, the first unit transmitter and the first unit signaling element. For example, the first transmitter-receiver unit includes two buttons each provided in a respective one of the substantially circular regions, each of the two buttons being operatively coupled to the transmitter for activating a transmission of a respective one of the first and second search signals when pushed by the intended user. In some embodiments of the invention, the circular regions have different diameters.

The first transmitter-receiver unit is wearable as a bracelet, a necklace, or in any other suitable manner and may be provided with an ornamental design.

Typically, the receiver unit is deprived of a transmitter.

In another broad aspect, the invention provides an object locating system usable by an intended user for locating an object, the object locating system comprising: a transmitter unit for selectively transmitting a search signal; and a receiver unit for receiving the search signal and issuing an alarm perceptible by the intended user when the search signal is received by the receiver unit; wherein the transmitter unit is configured and sized to be wearable by the intended user and the receiver unit is securable to the object.

For example, the proposed object locating system is usable for locating utility objects such as, for example, a TV remote, a set of keys, or the like, or for locating a valuable object, such as a piece of jewelry or the like.

Some advantages of the present invention are to provide a lost object locating system whose multiple transmitter-receiver units thus equipped with a mutually locatable means, allow to avoid losing or misplacing any one of the units, whose receiver unit may be suitably miniaturized to be embedded or otherwise concealed in a relatively small item such as, for example, a piece of jewelry and whose transmitter-receiver units are small enough to be conveniently attached to a bracelet, a necklace, a key chain, or the likes.

Typically, the proposed object locating system is relatively simple and economical to produce.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
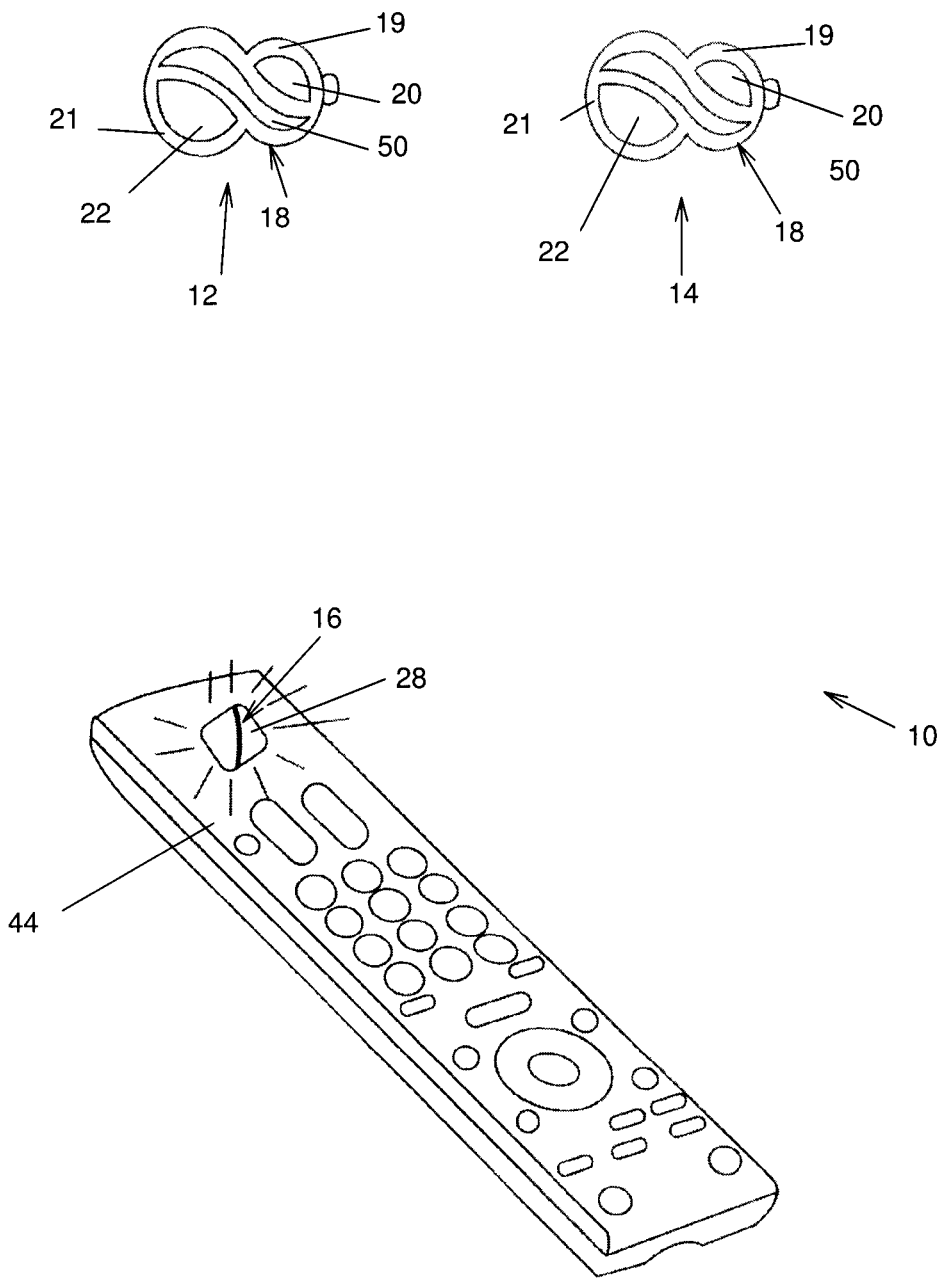
FIG. 1, in a perspective view, illustrates an object locating system in accordance with an embodiment of the present invention, the object locating system including two transmitter-receiver units and a receiver unit.

FIG. 1 show the various aspects of an embodiment of an object locating system 10 according to the present invention. The object locating system 10 generally comprises at least one, but preferably a plurality of nearly identical transmitter-receiver units, such as first and second transmitter-receiver units 12 and 14, and a receiver unit 16.

Figure 3:
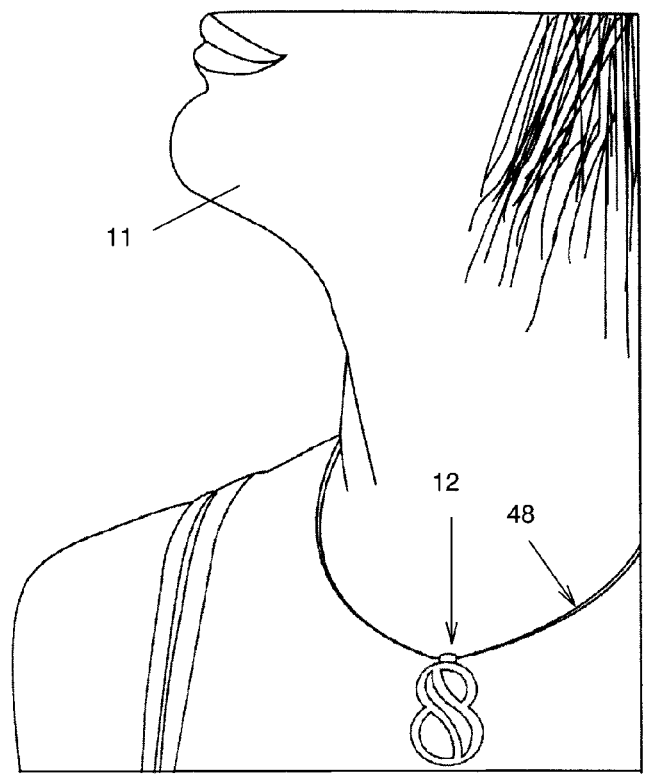
FIG. 3, in a perspective view, illustrates another alternative transmitter-receiver unit wearable as a necklace and usable in the system shown in FIG. 1.
Figure 4:
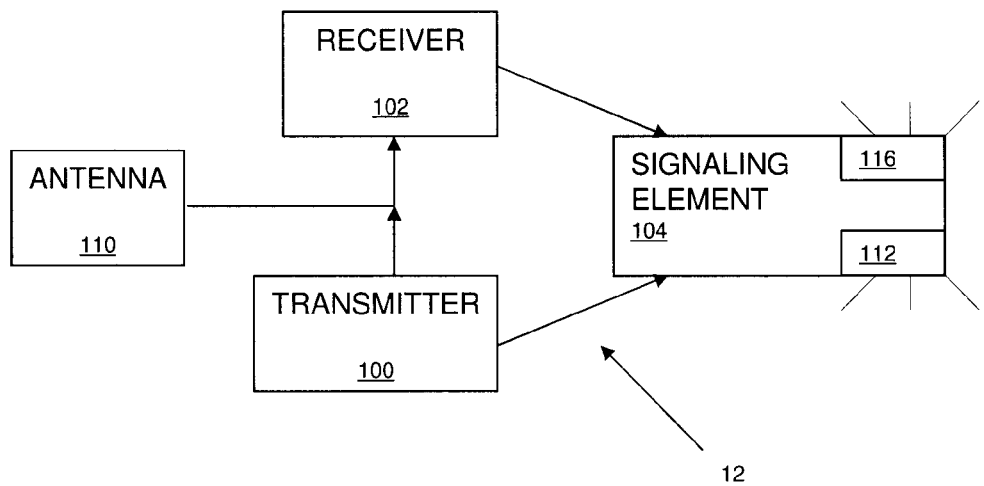
FIG. 4, in a schematic view, illustrates the transmitter-receiver units of FIGS. 1 to 3.

As shown in FIG. 4, the first transmitter-receiver unit 12 includes a transmitter 100 for selectively transmitting at least one of a first search signal and a second search signal, a receiver 102 for receiving a third search signal and a signaling element 104 operatively coupled to the receiver 102 for issuing a first alarm perceptible by an intended user 11 (partially seen in FIGS. 2 and 3) when the third search signal is received by the receiver 102. The second transmitter-receiver unit 14 is substantially similar to the first transmitter-receiver unit 12, except that it includes a transmitter 100 for selectively transmitting at least one of the first search signal and the third search signal, a receiver 102 for receiving the second search signal and a signaling element 104 operatively coupled to the receiver 102 for issuing a second alarm perceptible by the intended user when the second search signal is received by the receiver 102.

Figure 5:
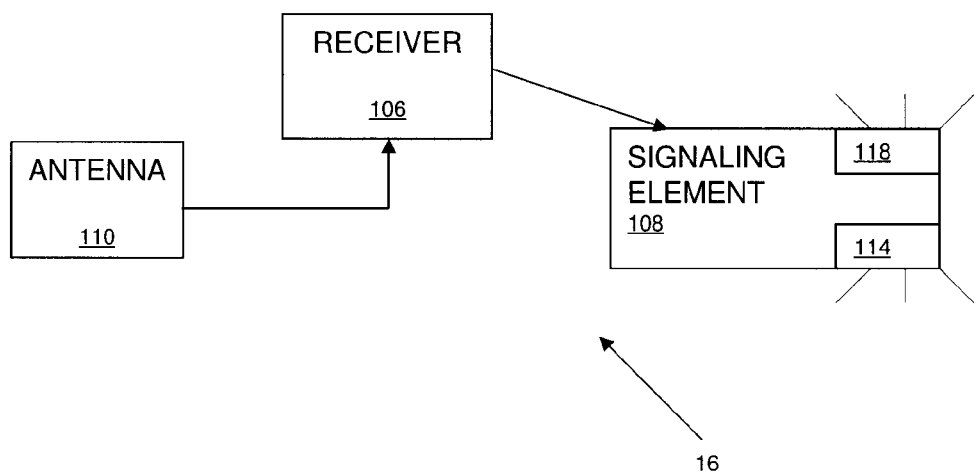
FIG. 5, in a schematic view, illustrates the receiver unit of FIG. 1.

As seen in FIG. 5, the receiver unit 16 includes a receiver 106 for receiving the first search signal and a signaling element 108 operatively coupled to the receiver 106 for issuing a third alarm perceptible by the intended user 11 when the first search signal is received by the receiver 106. Typically, to minimize its costs, complexity and dimensions, the receiver unit 16 is deprived of a transmitter.

The first and second transmitter-receiver units 12 and 14 are usable by the intended user 11 to locate each other and are each usable by the intended user to locate the receiver unit 16.

Typically, the first, second and third search signals are radio frequency electromagnetic signals and the first and second transmitter-receiver units 12 and 14 and the receiver unit 16 are provided with an antenna 110 operatively coupled to the transmitter 100 and receivers 102 and 106 for allowing emission and reception of radio frequency electromagnetic signals. However, in alternative embodiments of the invention, the first, second and third search signals are any other suitable signals, such as, for example, ultrasound signals.

Typically, the first, second and third alarms are audible alarms and the signaling elements 104 and 108 each include a respective sound emitting element 112 and 114 for emitting the first, second and third alarms. However, in alternative embodiments of the invention, the first, second and third alarms are any other suitable alarms, such as visual alarms and the signaling elements 104 and 108 each include a respective light emitting source 116 and 118 for emitting the first, second and third alarms. For example, the first, second and third alarms are signaled by a flashing light. In some embodiments of the drawings, the signaling elements 104 and 108 each include both a light emitting source 116 and 118 and a sound emitting element 112 and 114.

Returning to FIG. 1, the first and second transmitter-receiver units 12 and 14 each include a casing 18 and incorporate the transmitter 100, receiver 102 and the signaling element 104. Typically, the transmitter 100 and the receiver 102 are incorporated in a radio-frequency (RF) transmitter-receiver circuit and the signaling element 104 takes the form of a sound emitting element 112, such as a piezo-buzzer. Typically, the casing 18 also encases an autonomous power source, such as a battery cell (not shown in the drawings).

In some embodiments of the invention, the casing 18 is substantially 8-shaped defining two substantially adjacent substantially circular regions 19 and 21 that typically have different diameters. The first and second transmitter-receiver units 12 and 14 further include a first button 20 and a second button 22 that are electrically connected to the RF transmitter-receiver circuit. Typically, buttons 20, 22 are momentary push-buttons whose visible portions are preferably differentiated from one another by unique identifying indicias, size, shape and/or color. Each button 20 and 22 is provided in a respective one of the substantially circular regions 19 and 21 and is operatively coupled to the transmitter 100 for activating a transmission of a respective one of the first and second search signals when activated, ie pushed, by the intended user. This configuration is ergonomic as the shape of the casing 18, including in some embodiments the dimensions of each of the circular regions 19 and 21, allows easy manipulation of the first and second transmitter-receiver units 12 and 14 and easy tactile differentiation of the buttons 20 and 22 from each other. This is particularly useful as the attention of the intended user of the object locating system 10 can then be directed to the search of an object instead of being directed to the manipulation of the first and second transmitter-receiver units 12 and 14.

When one of the buttons 20 or 22 of one of the transmitter-receiver units 12 and 14 is depressed, such as first button 20, the latter activates the generation of the first search signal, that can be only decoded by the receiver unit 16. In some embodiments of the invention, an identical first search signal is generated by pressing the same first button 20 on each of the other transmitter-receiver units 12 and 14. However, in alternative embodiments, different search signals are generated by pressing the same first button 20 on each of the other transmitter-receiver units 12 and 14.

When the other one of the two buttons of the transmitter-receiver units 12 and 14 is depressed, such as second button 22, the latter activates the generation of the second and third search signals, depending on the transmitter-receiver units 12 and 14. Typically, but not exclusively, the second and third search signals are substantially similar to each other and can be decoded only by the other transmitter-receiver units 12 and 14 of the object locating system 10. In other words, the RF receiver circuit of the transmitter-receiver unit emitting the second search signal may filter out the latter emitted by its own RF transmitter circuit. Alternatively, either the RF receiver circuit and/or the sound emitting element of the emitting transmitter-receiver unit 12 or 14, may be disabled while the second search signal is generated. In some embodiments of the invention, the transmitter 100 is thus operatively coupled to the signaling element 104 for suppressing the first and second alarms when the transmitter 100 emits the second and third search signals.

Thus, when the second button 22 of a transmitter-receiver unit 12 and 14 is depressed, the second search signal is generated. The other transmitter-receiver units 12 and 14 of the object locating system 10 detect and identify this second search signal and responsively generate the first or second alarm for helping the user locate the position of the latters. In some embodiments of the invention, the first and second alarms are substantially identical to each other and differ from the third alarm. However, other relationships between alarms are within the scope of the invention.

The receiver unit 16 generally includes a device housing 28 that encases the receiver 106 and the signaling element 108. Typically, the receiver 106 is embodied in a RF signal receiver circuit and the signaling element 108 is embodied in a sound emitting element 112, such as a piezo-buzzer. Also, typically, an autonomous power source, such as a battery cell (not shown in the drawings), is enclosed within the housing 28.

When receiver unit 16 detects and identifies the first search signal emitted by any one, or all, of the transmitter-receiver units 12 and 14, such as when their first button 20 is depressed on a transmitter-receiver unit 12 and 14, the receiver unit 16 generates an audible signal through its sound emitting element 114.

Typically, the receiver unit 16 is not turned on until it receives the first search signal from a transmitter-receiver units 12 and 14 such that it draws negligible current from the power source. This means that batteries need not be replaced often in the receiver unit 16.

Typically, the first search signal generated by the transmitter-receiver units 12 and 14 is at least strong enough to be detected by a receiver unit 16 positioned, for example, on the other side of a wooden or concrete wall such as can be found, for examples, in and around an average size suburban house, a residential apartment, and the likes. Also, the transmitter-receiver units 12 and 14 and the receiver unit 16 generates audible sounds that are at least as strongly audible as, for examples, the ring tone of a standard residential or cellular telephone.

Figure 2:
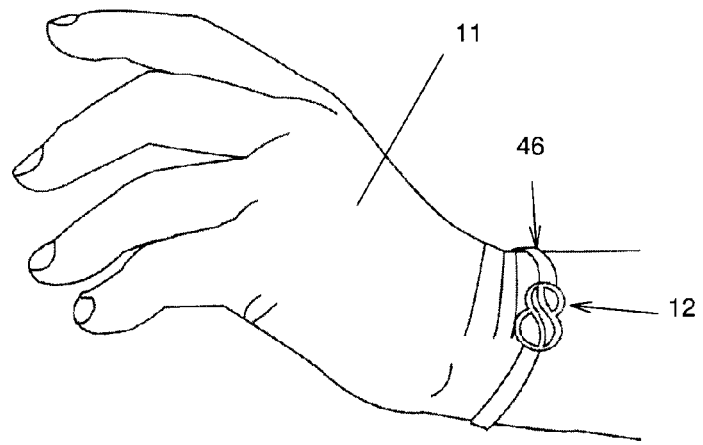
FIG. 2, in a perspective view, illustrates an alternative transmitter-receiver unit wearable as a bracelet and usable in the system shown in FIG. 1.

Typically, the transmitter-receiver units 12 and 14 may be suitably miniaturized such that they may be conveniently attached to a bracelet 46 (as shown in FIG. 2), or a necklace 48 (as shown in FIG. 3). In these embodiments, the at least one of the transmitter-receiver units 12 and 14 is configured and sized to be wearable by the intended user 11 as a bracelet 46, a necklace 48 or in any other suitable manner. In some embodiments of the invention, the transmitter-receiver units 12, 14 are provided with an ornamental design 50. Wearable transmitter-receiver units 12 and 14 facilitate location of objects as the transmitter-receiver units 12 and 14 are more likely to be available for this purpose at all time. Also, retrieval of transmitter-receiver units 12 and 14 is also facilitated in case one of them is missing.

Likewise, the receiver unit 16 may be suitably miniaturized such that it may be securable to, embedded in, or otherwise concealed within a piece of jewelry or a remote control unit 44 (as shown in FIG. 1), or the like.

It is to be noted that the transmitter-receiver units 12 and 14 and receiver unit 16 may be attached to an object using any suitable means such as, for examples, a double-sided tape, a magnetic element, glue, a thermal-bounding process, a keychain or a tying rope engaged in an integrally formed eyelet in the casing 18, or the likes.

In one mode of operation, the receiver unit 16 is first attached to, or otherwise embedded in, an utility object such as a TV remote 44, or a valuable object such as a piece of jewelry, or the like. The user may then use one of the transmitter-receiver units 12, 14 and press on the first button 20 in order to generate the first search signal and force the receiver unit 16, thus attached to the utility or valuable object, to generate an alarm which, in turn, help the user locate the position of the object. In a similar manner, the user may press on the second button 22 of the transmitter-receiver units 12 and 14 to force the other transmitter-receiver units 12 and 14 of the system to generate an alarm, for example an audibly differentiable alarm, in order to help the user locate the position of the other transmitter-receiver units.

The casing and housing 18 and 28 of a paired set of transmitters-receivers and receiver units may advantageously have different colors and/or design to help each occupants, for example, sharing a same house to differentiate the components of their own object locating systems 10.

Although the present invention has been described hereinabove by way of preferred embodiments thereof, it can be modified, without departing from the spirit and nature of the subject invention as defined in the appended claims.

What is claimed is:

1. An object locating system usable by an intended user for locating an object, said object locating system comprising:
    a first transmitter-receiver unit including a first unit transmitter for selectively transmitting at least one of a first search signal and a second search signal, a first unit receiver for receiving a third search signal and a first unit signaling element operatively coupled to said first unit receiver for issuing a first alarm perceptible by said intended user when said third search signal is received by said first unit receiver;
    a second transmitter-receiver unit including a second unit transmitter for selectively transmitting at least one of said first search signal and said third search signal, a second unit receiver for receiving said second search signal and a second unit signaling element operatively coupled to said second unit receiver for issuing a second alarm perceptible by said intended user when said second search signal is received by said second unit receiver;
    a receiver unit including a third unit receiver for receiving said first search signal and a third unit signaling element operatively coupled to said third unit receiver for issuing a third alarm perceptible by said intended user when said first search signal is received by said third unit receiver;

wherein said first transmitter-receiver unit is configured and sized to be wearable by said intended user and said receiver unit is securable to said object;

whereby said first and second transmitter-receiver units are usable by said intended user to locate each other and are each usable by said intended user to locate said receiver unit.

2. An object locating system as defined in claim 1, wherein said first, second and third search signals are radio frequency electromagnetic signals.

3. An object locating system as defined in claim 1, wherein said first, second and third search signals are ultrasound signals.

4. An object locating system as defined in claim 1, wherein second and third search signals are substantially similar to each other.

5. An object locating system as defined in claim 4, wherein said first and second unit transmitters are operatively coupled respectively to said first and second unit signaling elements for suppressing respectively said first and second alarms when said first and second unit transmitters emit respectively said second and third search signals.

6. An object locating system as defined in claim 1, wherein said first, second and third alarms are visual alarms and said first, second and third unit signaling elements each include a respective light emitting source for emitting said first, second and third alarms.

7. An object locating system as defined in claim 1, wherein said first, second and third alarms are audible alarms and said first, second and third unit signaling elements each include a respective sound emitting element for emitting said first, second and third alarms.

8. An object locating system as defined in claim 1, wherein said first and second alarms are substantially identical to each other.

9. An object locating system as defined in claim 8, wherein said first and second alarms differ from said third alarm.

10. An object locating system as defined in claim 1, wherein said first transmitter-receiver unit includes a substantially 8-shaped casing defining two substantially adjacent substantially circular regions, said casing containing said first unit receiver, said first unit transmitter and said first unit signaling element.

11. An object locating system as defined in claim 10, wherein said first transmitter-receiver unit includes two buttons each provided in a respective one of said substantially circular regions, each of said two buttons being operatively coupled to said transmitter for activating a transmission of a respective one of said first and second search signals when activated.

12. An object locating system as defined in claim 11, wherein said two buttons have different dimensions.

13. An object locating system as defined in claim 11, wherein said circular regions have different diameters.

14. An object locating system as defined in claim 1, wherein said first transmitter-receiver unit is wearable as a bracelet.

15. An object locating system as defined in claim 1, wherein said first transmitter-receiver unit is wearable as a necklace.

16. An object locating system as defined in claim 1, wherein said first transmitter-receiver unit is provided with an ornamental design.

17. An object locating system as defined in claim 1, wherein said receiver unit is deprived of a transmitter.

18. An object locating system usable by an intended user for locating an object, said object locating system comprising:
a first transmitter-receiver unit including a first unit transmitter for selectively transmitting at least one of a first search signal and a second search signal, a first unit receiver for receiving a third search signal and a first unit signaling element operatively coupled to said first unit receiver for issuing a first alarm perceptible by said intended user when said third search signal is received by said first unit receiver;
a second transmitter-receiver unit including a second unit transmitter for selectively transmitting at least one of said first search signal and said third search signal, a second unit receiver for receiving said second search signal and a second unit signaling element operatively coupled to said second unit receiver for issuing a second alarm perceptible by said intended user when said second search signal is received by said second unit receiver;
a receiver unit including a third unit receiver for receiving said first search signal and a third unit signaling element operatively coupled to said third unit receiver for issuing a third alarm perceptible by said intended user when said first search signal is received by said third unit receiver;
wherein said receiver unit is deprived of a transmitter.

* * * * *